United States Patent
Takeda

(10) Patent No.: US 12,182,053 B2
(45) Date of Patent: Dec. 31, 2024

(54) ELECTRONIC DEVICE INVALIDATING COMMANDS EXCEPT FOR ONE COMMAND AND METHOD OF PROCESSING ELECTRONIC DEVICE

(71) Applicant: SEIKO EPSON CORPORATION, Tokyo (JP)

(72) Inventor: Kazuyoshi Takeda, Chino (JP)

(73) Assignee: SEIKO EPSON CORPORATION (JP)

( * ) Notice: Subject to any disclaimer, the term of this patent is extended or adjusted under 35 U.S.C. 154(b) by 49 days.

(21) Appl. No.: 18/173,153

(22) Filed: Feb. 23, 2023

(65) Prior Publication Data

US 2023/0267092 A1    Aug. 24, 2023

(30) Foreign Application Priority Data

Feb. 24, 2022   (JP) ................................ 2022-027089

(51) Int. Cl.
   *G06F 13/42*   (2006.01)
   *G06F 3/02*    (2006.01)

(52) U.S. Cl.
   CPC ............ *G06F 13/42* (2013.01); *G06F 3/0202* (2013.01); *G06F 2213/40* (2013.01)

(58) Field of Classification Search
   CPC ...................................................... G06F 13/42
   See application file for complete search history.

(56) References Cited

U.S. PATENT DOCUMENTS

| | | | |
|---|---|---|---|
| 2007/0213652 A1* | 9/2007 | Carter | A61N 1/044 |
| | | | 604/20 |
| 2021/0096150 A1 | 4/2021 | Sato et al. | |
| 2022/0179409 A1* | 6/2022 | Bhagat | G05D 1/0038 |

FOREIGN PATENT DOCUMENTS

JP          2021056055 A       4/2021

* cited by examiner

*Primary Examiner* — David E Martinez
(74) *Attorney, Agent, or Firm* — Harness, Dickey & Pierce, P.L.C.

(57) ABSTRACT

An electronic device includes: a processing unit; and a plurality of interfaces configured to transmit commands to the processing unit. The processing unit invalidates the commands from the interfaces other than the interface from which the command first received by the processing unit after start-up is transmitted. The processing unit has a plurality of modes, and invalidates the commands other than the command that is valid for the selected mode. The plurality of interfaces include a user interface configured to detect an operation of a user and a communication interface configured to communicate with an external device.

7 Claims, 9 Drawing Sheets ial sensor and a processing unit that processes a detection signal
ELECTRONIC DEVICE INVALIDATING COMMANDS EXCEPT FOR ONE COMMAND AND METHOD OF PROCESSING ELECTRONIC DEVICE The present application is based on, and claims priority from JP Application Serial Number 2022-027089, filed Feb. 24, 2022, the disclosure of which is hereby incorporated by reference herein in its entirety.

BACKGROUND

1. Technical Field

The present disclosure relates to an electronic device and a method of processing an electronic device.

2. Related Art

An inertial measurement unit disclosed in JP-A-2021-056055 includes a sensor unit including at least one inertial sensor and a processing unit that processes a detection signal of the inertial sensor. In addition, the inertial measurement unit includes a wireless communication unit that wirelessly communicates with an external device, a wired communication unit that communicates with an external device via a wire, and a switch that is operated by a user. A wireless communication mode in which the inertial measurement unit is used in a state of being connected to the external device via the wireless communication unit, a wired communication mode in which the inertial measurement unit is used in a state of being connected to the external device via the wired communication unit, and a single mode in which the inertial measurement unit is used by a single inertial measurement unit using the switch without being connected to the external device can be selected.

In a device including a plurality of interfaces (a wireless communication unit, a wired communication unit, and a switch) as in the inertial measurement unit of JP-A-2021-056055, commands received from the plurality of interfaces may collide with each other. Therefore, there is a concern that an unintended failure occurs and robustness decreases.

SUMMARY

An electronic device according to the present disclosure includes:
 a processing unit; and
 a plurality of interfaces configured to transmit commands to the processing unit, in which
 the processing unit invalidates the commands from the interfaces other than the interface from which the command first received by the processing unit after start-up is transmitted.

In a method of processing an electronic device including a processing unit and a plurality of interfaces that transmit commands to the processing unit according to the present disclosure,
 the processing unit invalidates the commands from the interfaces other than the interface from which the command first received by the processing unit after start-up is transmitted.

DESCRIPTION OF EXEMPLARY EMBODIMENTS

Hereinafter, an electronic device and a method of processing an electronic device according to the present disclosure will be described in detail based on a preferred embodiment shown in the accompanying drawings.

Figure 1:
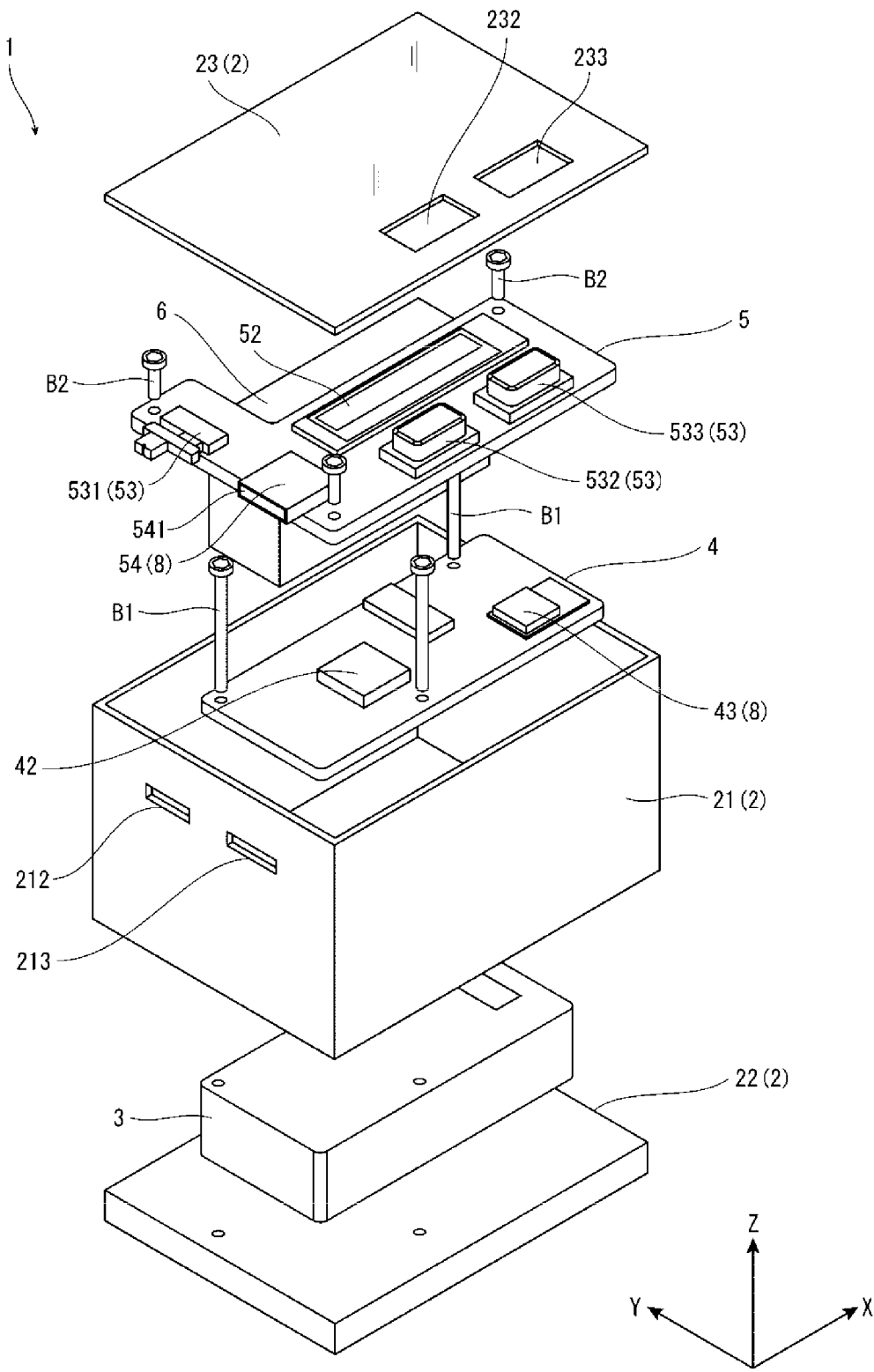
FIG. 1 is an exploded perspective view showing an electronic device according to a preferred embodiment.
Figure 2:
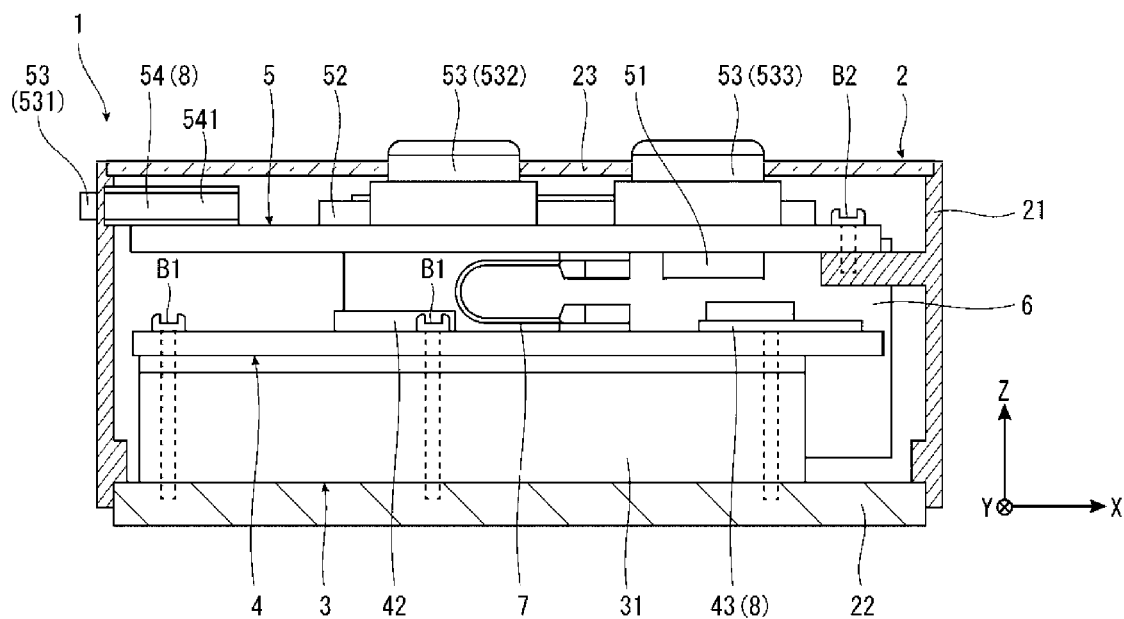
FIG. 2 is a cross-sectional view showing an inside of the electronic device.
Figure 3:
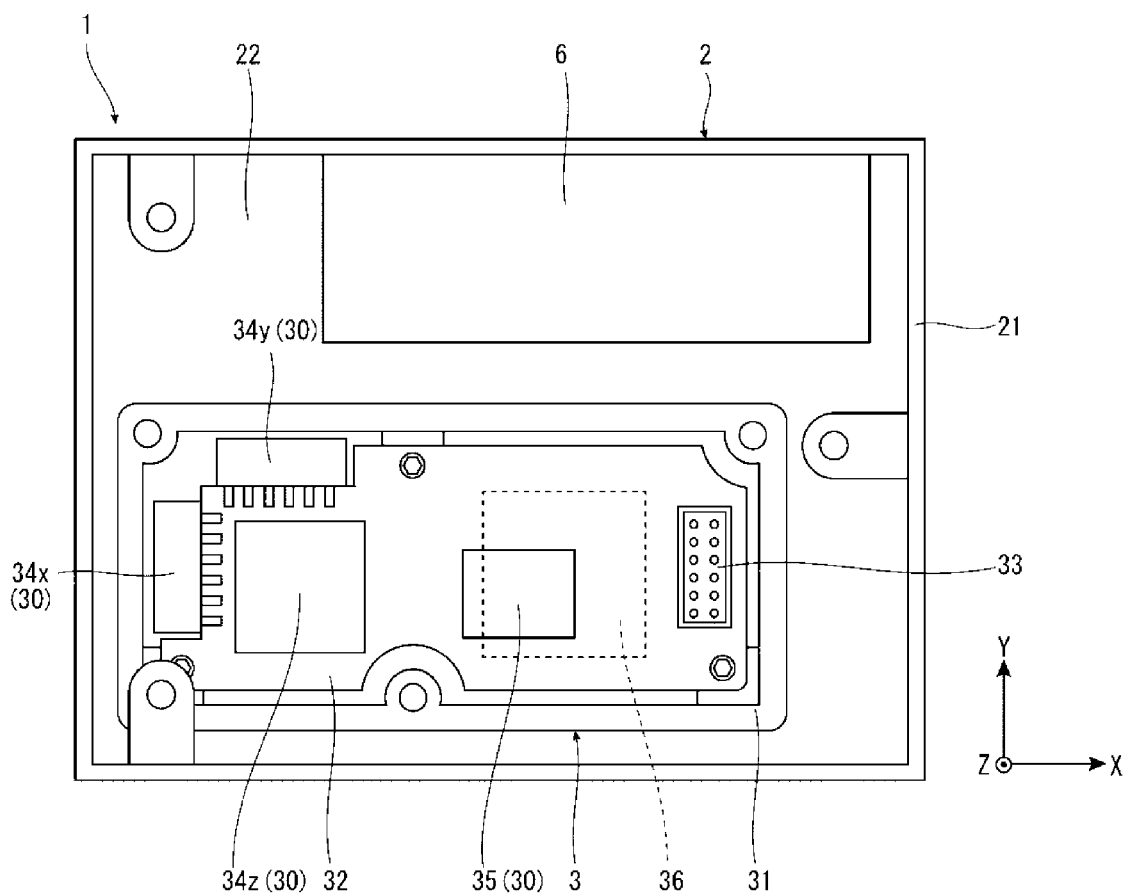
FIG. 3 is a plan view showing an inside of an inertial sensor unit.
Figure 4:
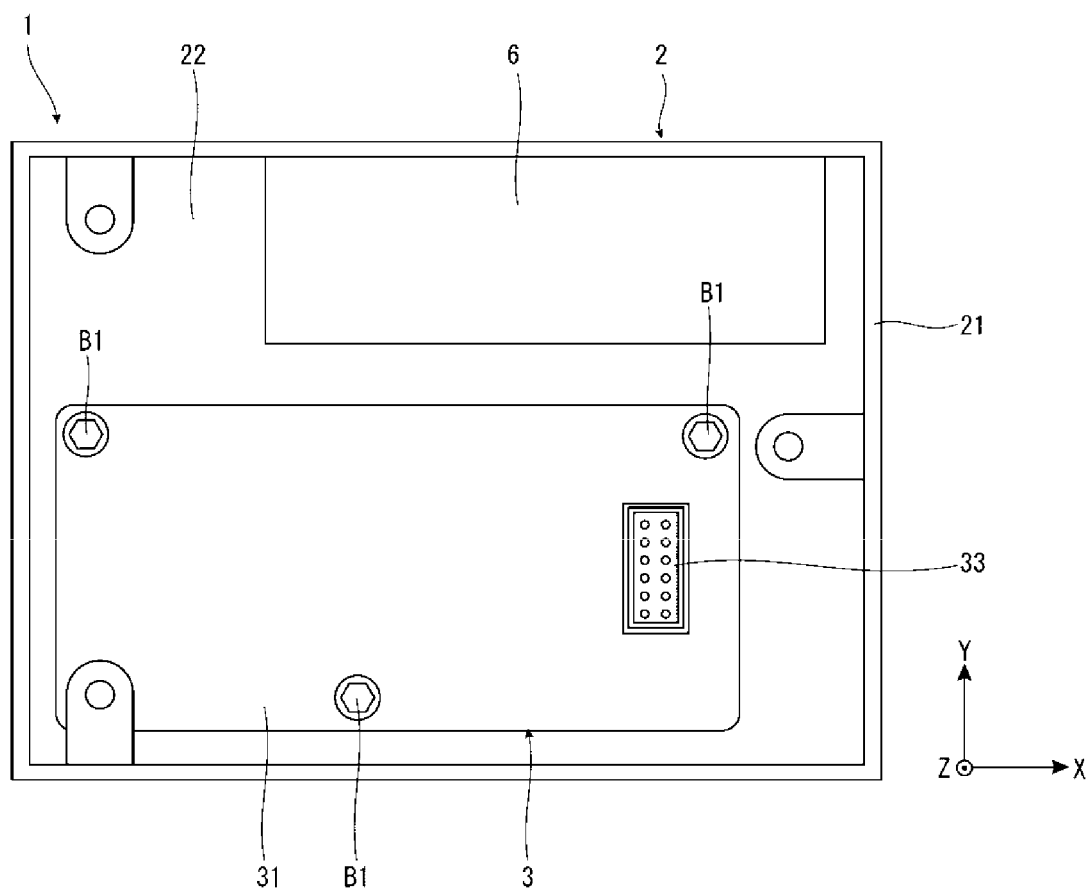
FIG. 4 is a plan view showing an upper surface of the inertial sensor unit.
Figure 5:
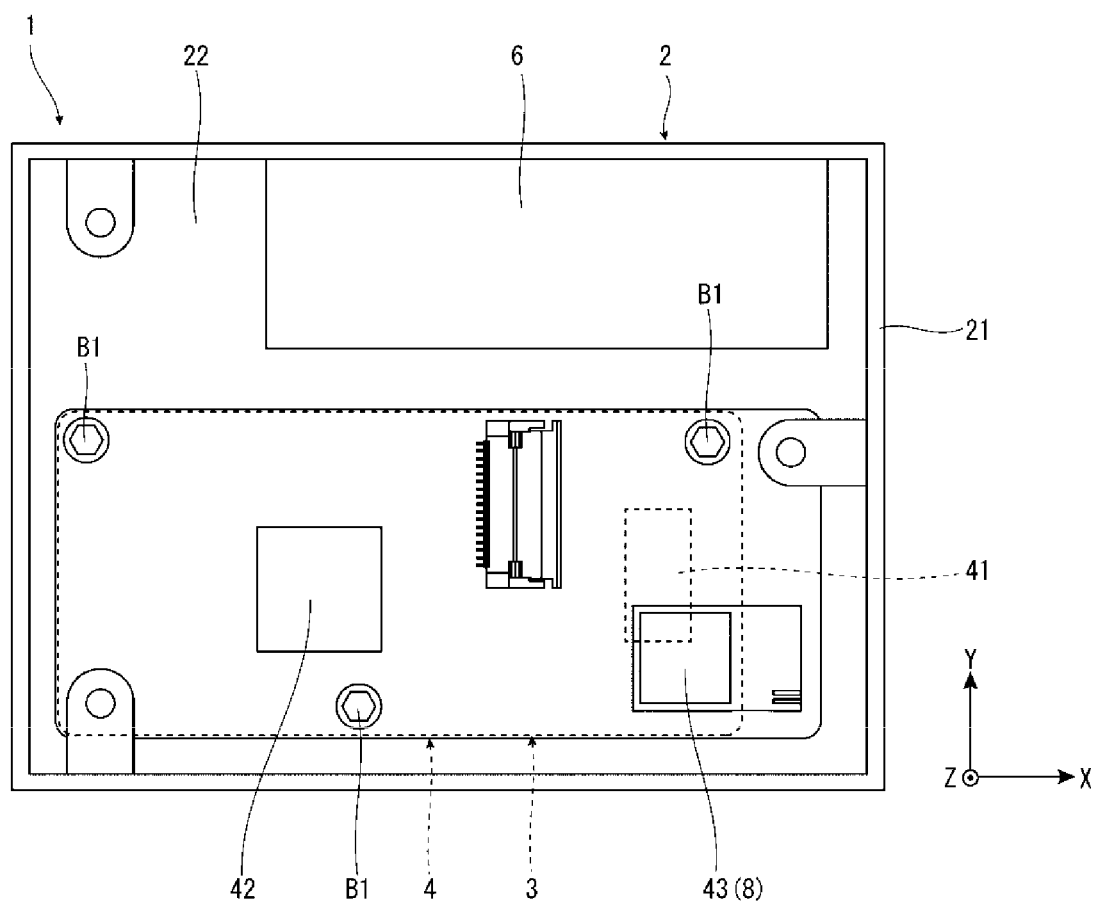
FIG. 5 is a plan view showing an upper surface of a first circuit board.
Figure 6:
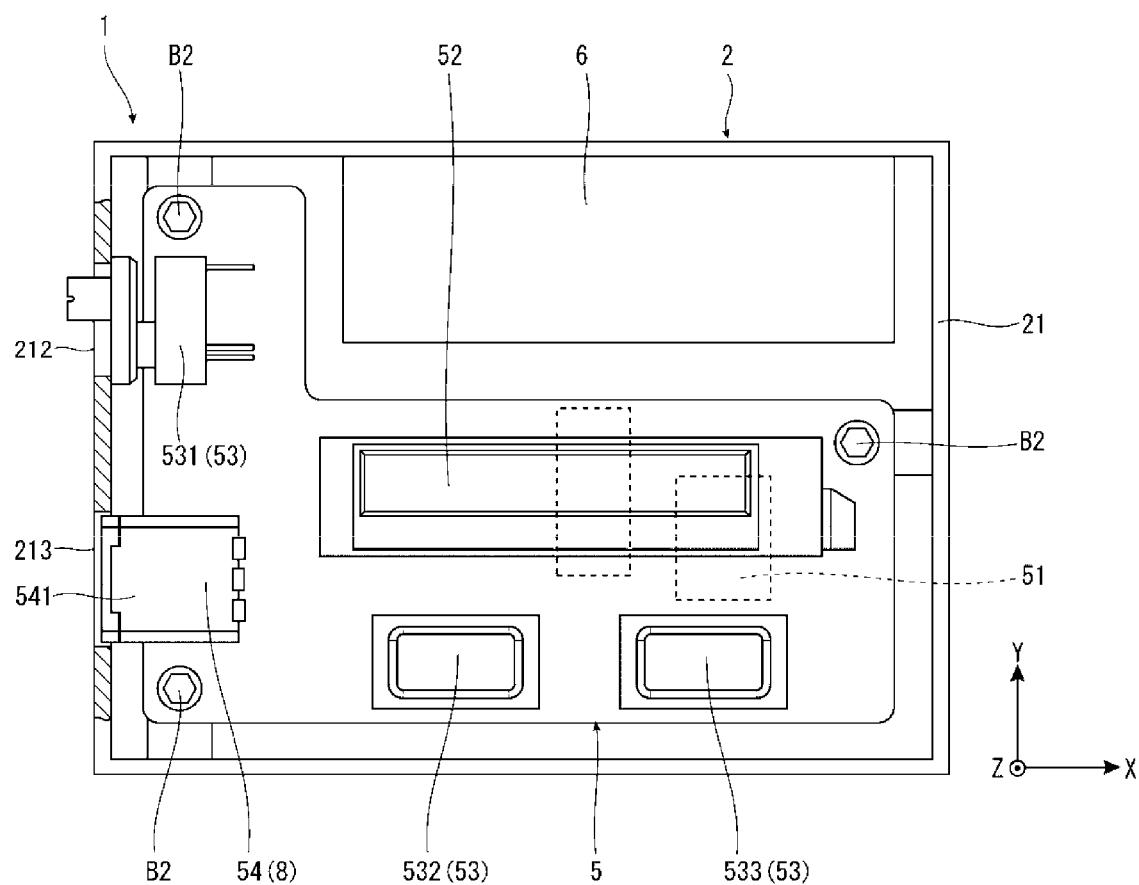
FIG. 6 is a plan view showing an upper surface of a second circuit board.
Figure 7:
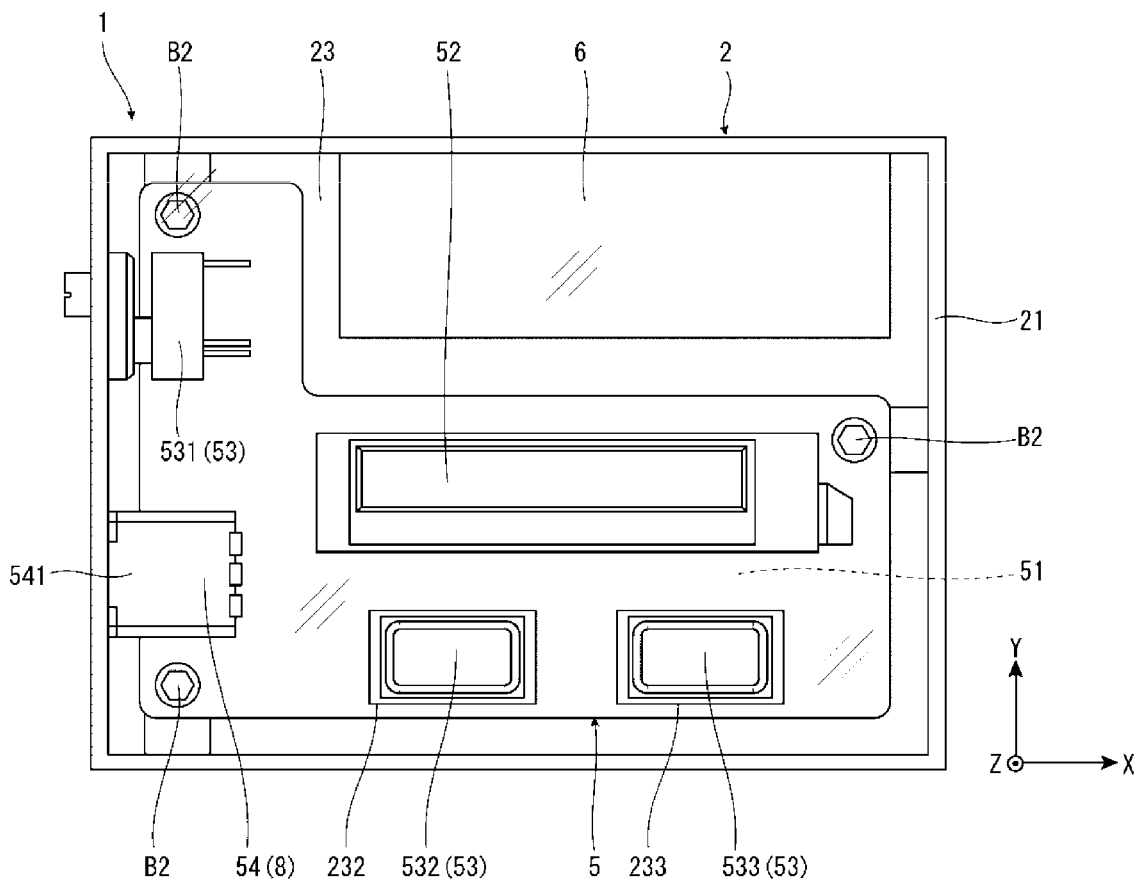
FIG. 7 is a plan view showing an upper surface of the electronic device.
Figure 8:
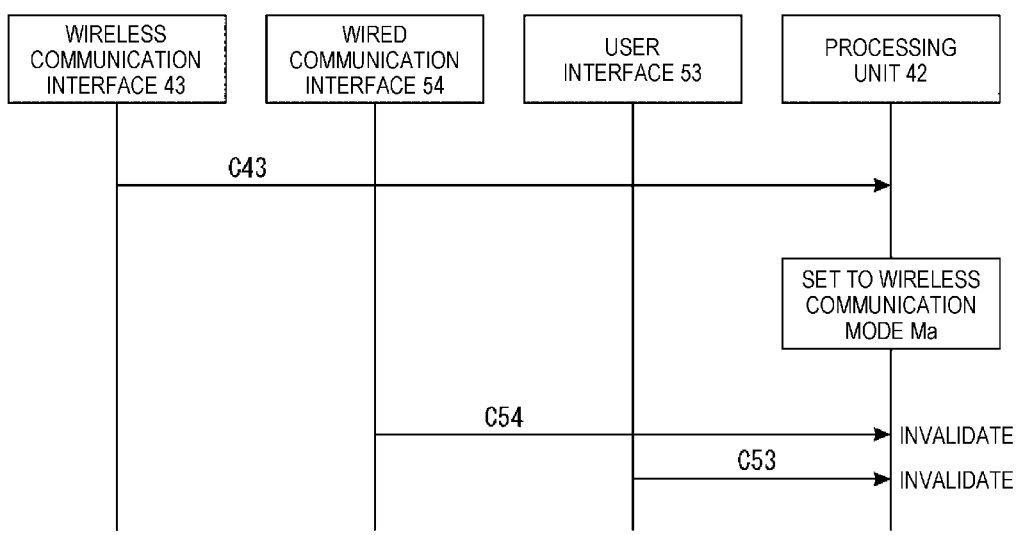
FIG. 8 is a timing chart showing a method of processing the electronic device.
Figure 9:
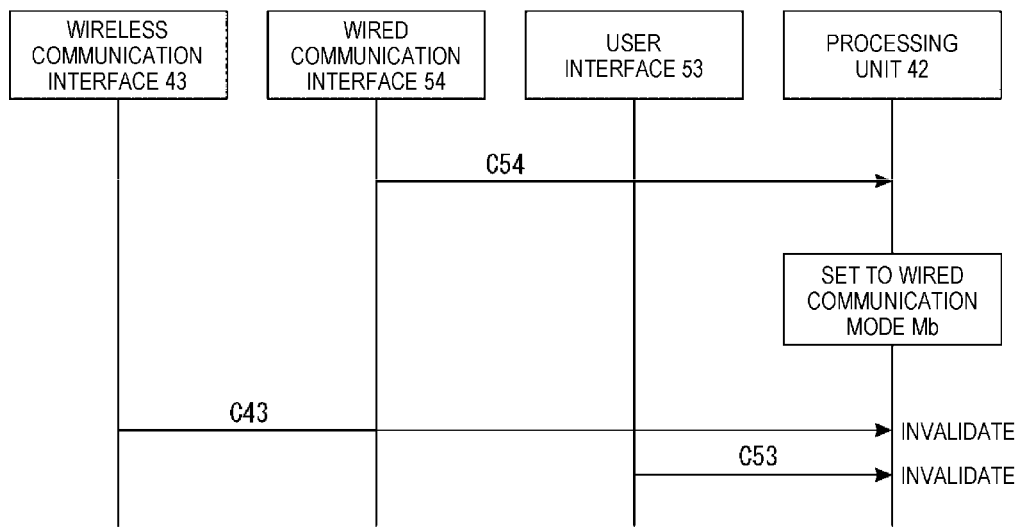
FIG. 9 is a timing chart showing the method of processing the electronic device.
Figure 10:
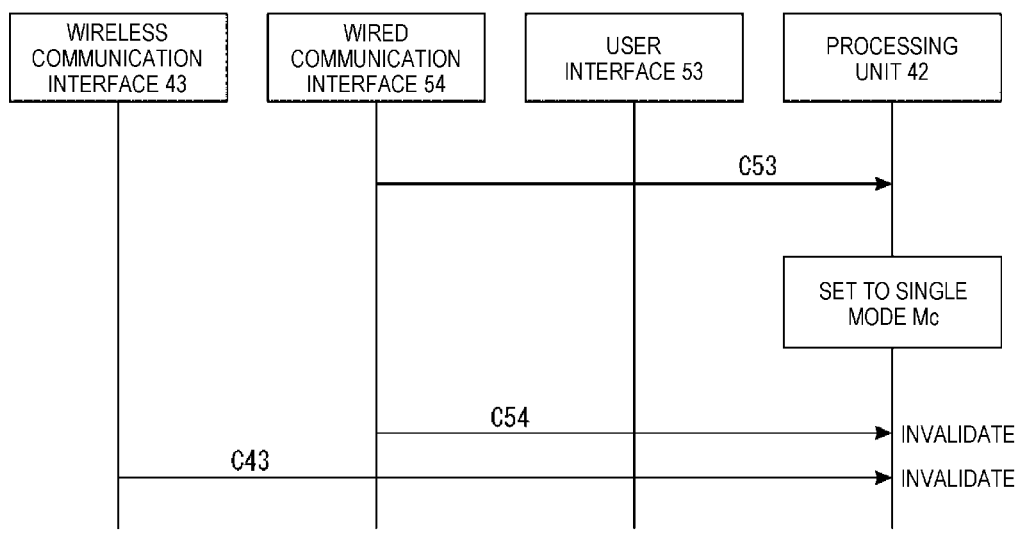
FIG. 10 is a timing chart showing the method of processing the electronic device.
Figure 11:
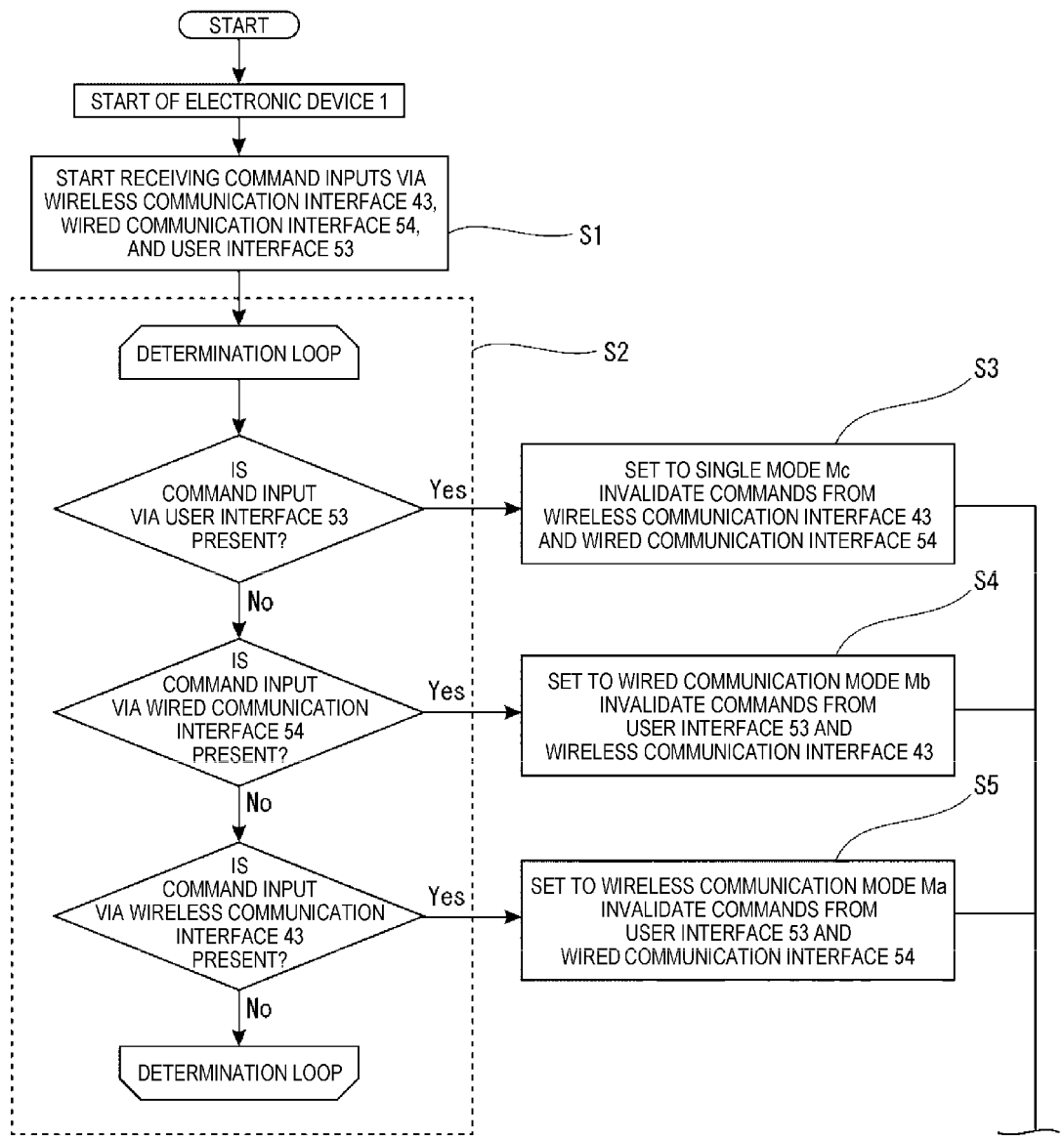
FIG. 11 is a flowchart showing the method of processing the electronic device.
Figure 12:
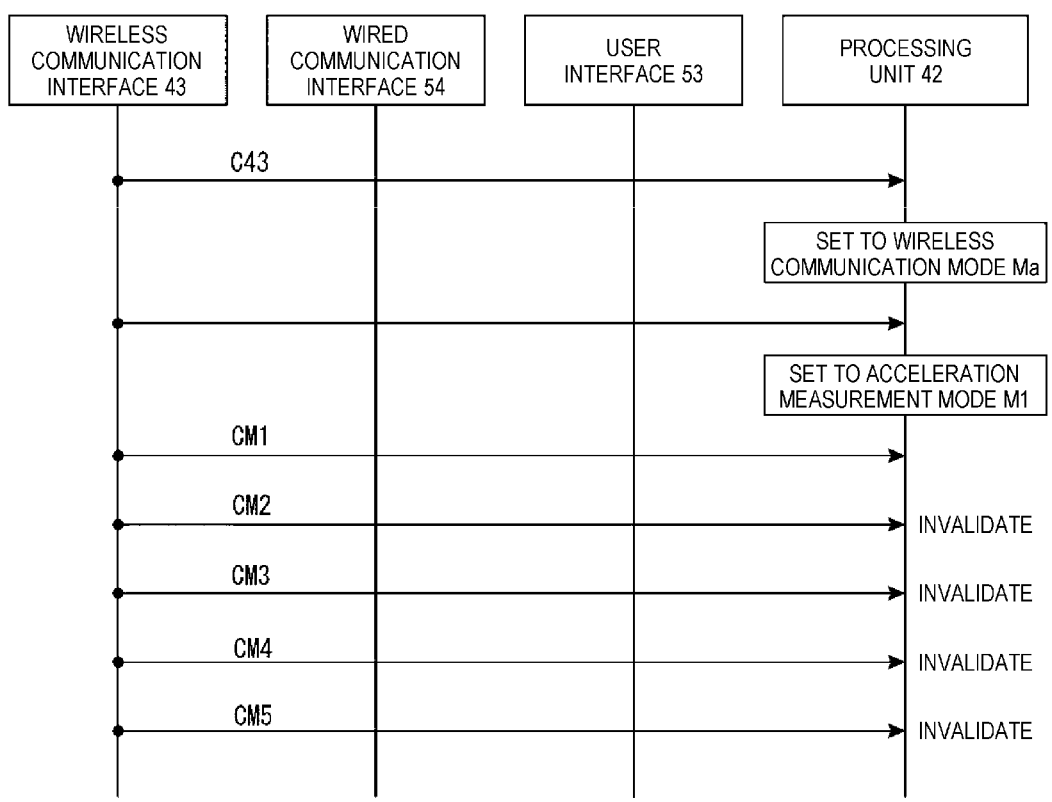
FIG. 12 is a timing chart showing the method of processing the electronic device.

FIG. 1 is an exploded perspective view showing the electronic device according to the preferred embodiment. FIG. 2 is a cross-sectional view showing an inside of the electronic device. FIG. 3 is a plan view showing an inside of an inertial sensor unit. FIG. 4 is a plan view showing an upper surface of the inertial sensor unit. FIG. 5 is a plan view showing an upper surface of a first circuit board. FIG. 6 is a plan view showing an upper surface of a second circuit board. FIG. 7 is a plan view showing an upper surface of the electronic device. FIGS. 8 to 10 are timing charts showing the method of processing the electronic device. FIG. 12 is a flowchart showing the method of processing the electronic device. FIG. 11 is a timing chart showing the method of processing the electronic device.

For convenience of description, X, Y, and Z axes, which are orthogonal to one another, are shown in each of FIGS. 1 to 7. Hereinafter, a direction along the X axis is also referred to as an "X axis direction", a direction along the Y axis is also referred to as a "Y axis direction", and a direction along the Z axis is also referred to as a "Z axis direction". In addition, an arrow side of each axis is also referred to as a "plus side" and an opposite side thereof is also referred to as a "minus side". The plus side in the Z axis direction is also referred to as "upper", and the minus side in the Z axis direction is also referred to as "lower".

An electronic device 1 shown in FIG. 1 is an inertial measurement unit (IMU), and measures an acceleration, an angular velocity, a vibration, and an inclination of a measurement target, and performs VC determination based on the acceleration and the angular velocity. VC is an environmental vibration standard standardized by the Institute of Environmental Sciences and Technology (IEST). In addition, the VC determination refers to determining which standard such as VC-A, VC-B, VC-C, VC-D, and VC-E is satisfied as the vibration of the measurement target. However, items measured by the electronic device 1 are not particularly limited.

As shown in FIGS. 1 and 2, the electronic device 1 includes a housing 2, and an inertial sensor unit 3, a first circuit board 4, a second circuit board 5, and a battery 6 which are accommodated in the housing 2. Such an electronic device 1 is operated by a power supply of an external device such as a computer or operated by the built-in battery 6.

The housing 2 includes a frame-shaped base 21 that forms a side surface of the housing 2, a bottom plate 22 that is fixed to a lower end portion of the base 21 and forms a bottom surface of the housing 2, and a lid plate 23 that is fixed to an upper end portion of the base 21 and forms a top surface of the housing 2. The bottom plate 22 is screwed to the base 21, and the lid plate 23 is fixed to the base 21 by an adhesive, a double-sided tape, or the like. In the electronic device 1, the bottom plate 22 serves as a mounting surface for the measurement target. In addition, the lid plate 23 has optical transparency such that information displayed inside the housing 2, in particular, on a display unit 52, which will be described later, can be visually recognized from the outside through the lid plate 23. The lid plate 23 may be colorless and transparent, and a color, a transmittance, or the like may be changed within a range in which the display unit 52 can be visually recognized from the outside.

The base 21 and the bottom plate 22 are each made of a metal material such as aluminum, and the lid plate 23 is made of a glass material. However, constituent materials of the base 21, the bottom plate 22, and the lid plate 23 are not particularly limited.

The battery 6 is disposed on the side surface of the housing 2. The inertial sensor unit 3 and the first circuit board 4 are fastened to the bottom plate 22 (a bottom portion of the housing 2) by screws B1 in a state in which the first circuit board 4 is stacked on the inertial sensor unit 3. The second circuit board 5 is fixed to the base 21 by screws B2. The first circuit board 4 and the second circuit board 5 overlap each other in a state of being separated from each other in the Z axis direction, and are electrically coupled to each other by a cable 7.

Inertia Sensor Unit 3

The inertial sensor unit 3 includes a physical quantity sensor 30 that outputs a signal corresponding to a physical quantity. The inertial sensor unit 3 of the embodiment is a six-axis inertial sensor, and can independently detect an acceleration in the X axis direction, an acceleration in the Y axis direction, an acceleration in the Z axis direction, an angular velocity around the X axis, an angular velocity around the Y axis, and an angular velocity around the Z axis.

As shown in FIG. 3, the inertial sensor unit 3 includes a case 31 and a mounting board 32 accommodated in the case 31. A connector 33, an angular velocity sensor 34z that detects the angular velocity around the Z axis, and an acceleration sensor 35 that detects accelerations in respective axial directions of the X axis, the Y axis, and the Z axis are mounted on an upper surface of the mounting board 32. An angular velocity sensor 34x that detects the angular velocity around the X axis and an angular velocity sensor 34y that detects the angular velocity around the Y axis are mounted on a side surface of the mounting board 32. A control IC 36 is mounted on a lower surface of the mounting board 32. In the inertial sensor unit 3, the angular velocity sensors 34x, 34y, and 34z and the acceleration sensor 35 are the physical quantity sensor 30. As shown in FIG. 4, the connector 33 is exposed to the outside of the case 31 through an opening formed in an upper surface of the case 31.

A configuration of each of the angular velocity sensors 34x, 34y, and 34z and the acceleration sensor 35 is not particularly limited as long as the angular velocity sensors 34x, 34y, and 34z and the acceleration sensor 35 can exhibit their functions. In the embodiment, the angular velocity sensors 34x, 34y, and 34z each include a quartz crystal vibrator that performs a flexural vibration, and detect the angular velocity using the Coriolis force. On the other hand, the acceleration sensor 35 includes a silicon MEMS including a comb-shaped fixed electrode and a movable electrode, and detects the acceleration using a change in capacitance formed between the fixed electrode and the movable electrode. The acceleration sensor 35 may include a quartz crystal vibrator, and may detect the acceleration using a change in vibration frequency of the quartz crystal vibrator.

The control IC 36 is, for example, a micro controller unit (MCU), and controls each unit of the inertial sensor unit 3. A storage unit of the control IC 36 stores a program defining an order and contents for detecting an acceleration and an angular velocity, a program for digitizing detection data and incorporating the digitized detection data into packet data, accompanying data, or the like. That is, the storage unit is a computer-readable storage medium. In addition, one or more electronic components may be mounted on the mounting board 32 as necessary.

Although the inertial sensor unit 3 is described above, the configuration of the inertial sensor unit 3 is not particularly limited as long as the inertial sensor unit 3 includes at least one physical quantity sensor 30. For example, the inertial sensor unit 3 may omit the angular velocity sensors 34x, 34y, and 34z. That is, a configuration in which a triaxial acceleration can be detected may be used. On the contrary, the inertial sensor unit 3 may omit the acceleration sensor 35. That is, a configuration in which a triaxial angular velocity can be detected may be used. The physical quantity to be detected is not limited to an acceleration or an angular velocity, and may be any physical quantity such as a pressure, a temperature, and a quantity of light.

First Circuit Board 4

The first circuit board 4 is a rigid wiring board. As shown in FIG. 5, the first circuit board 4 has substantially the same size as the inertial sensor unit 3 in a plan view in the Z axis direction. The first circuit board 4 is mounted on an upper surface of the inertial sensor unit 3, and is fastened together with the inertial sensor unit 3 to the bottom plate 22 by the screws B1. A connector 41 coupled to the connector 33 is disposed on a lower surface of the first circuit board 4. A processing unit 42 and a wireless communication interface 43 are disposed on an upper surface of the first circuit board 4.

The processing unit 42 is, for example, a processing circuit including an MCU. A storage unit included in the processing unit 42 stores a program, data, or the like necessary for processing performed by the electronic device 1. The storage unit is a computer-readable storage medium. The processing unit 42 is electrically coupled to the inertial sensor unit 3, and performs analysis processing for an acceleration, an angular velocity, a vibration, an inclination, VC determination, or the like of the measurement target based on a detection signal of the inertial sensor unit 3. According to such a configuration, it is possible to output, instead of the detection signal itself of the inertial sensor unit 3, information obtained by processing the detection signal to the outside. Therefore, the processing of the detection signal does not need to be performed on the external device side coupled to the electronic device 1, and a processing load of the external device can be reduced and the cost can be reduced. The electronic device 1 can be easily used by a user having poor knowledge required for processing the detection signal. Therefore, the convenience of the electronic device 1 is improved.

The processing unit 42 has a plurality of modes (measurement modes) M, in the embodiment, including an acceleration measurement mode M1 for measuring the acceleration of the measurement target, an angular velocity measurement mode M2 for measuring the angular velocity of the measurement target, a vibration measurement mode M3 for measuring the vibration of the measurement target, an inclination measurement mode M4 for measuring the inclination of the measurement target, and a VC measurement mode M5 for performing the VC determination. Then, the processing unit 42 operates in one mode M selected by the user. An operation method of the processing unit 42 is not particularly limited, and for example, all the items may be analyzed regardless of the selected mode M, and only the analysis result of the item corresponding to the selected mode M may be output. For convenience of description, the modes M, the angular velocity measurement mode M2, the vibration measurement mode M3, the inclination measurement mode M4, and the VC measurement mode M5 are not shown.

The wireless communication interface 43 communicates with the external device. The wireless communication interface 43 is, for example, a wireless communication IC, and performs wireless communication using Bluetooth (registered trademark), particularly Bluetooth low energy (BLE). Accordingly, it is possible to perform communication with low power consumption. However, a communication standard is not particularly limited, and other wireless communication such as ZigBee (registered trademark), Wi-SUN (registered trademark), or Wi-Fi (registered trademark) may be used.

Second Circuit Board 5

The second circuit board 5 is a rigid wiring board. As shown in FIG. 6, the second circuit board 5 is disposed above the first circuit board 4 and overlaps with the first circuit board 4 in a state of being separated from the first circuit board 4. The second circuit board 5 is coupled to the first circuit board 4 via the cable 7. As described above, by overlapping the first circuit board 4 with the second circuit board 5, it is possible to reduce spread of the electronic device 1 in the X axis direction and the Y axis direction, in particular, an installation surface (footprint) of the electronic device 1. Therefore, the electronic device 1 can be mounted on a narrower surface, and the convenience of the electronic device 1 is improved. A power supply interface 51, the display unit 52, a wired communication interface 54, and a user interface 53 are mounted on an upper surface of the second circuit board 5.

The wired communication interface 54 includes, for example, a USB female connector 541, and performs wired communication with the external device. The female connector 541 is exposed to the outside through an opening 213 formed in the side surface of the housing 2. The female connector 541 is arranged side by side with a power switch 531. A configuration of the wired communication interface 54 is not particularly limited as long as the wired communication interface 54 can perform wired communication with the external device.

The user interface 53 includes the power switch 531, a mode switching switch 532, and a determination switch 533. The power switch 531 is a switch for selecting ON/OFF of the power supply. The mode switching switch 532 is a switch for switching the modes M. In the embodiment, every time the mode switching switch 532 is pressed, the acceleration measurement mode M1, the angular velocity measurement mode M2, the vibration measurement mode M3, the inclination measurement mode M4, and the VC measurement mode M5 are switched in this order. The determination switch 533 is a switch for determining (OK) the content selected by the mode switching switch 532.

The power switch 531 is a slide switch having a protruding tab, and protrudes to the outside through an opening 212 formed in the side surface of the housing 2. On the other hand, the mode switching switch 532 and the determination switch 533 are each a press-type switch, and as shown in FIG. 7, protrude to the outside through openings 232 and 233 formed in the lid plate 23.

The power supply interface 51 is a power supply circuit that selects a power supply destination and charges the battery 6. When the power supply of the external device can be used, the power supply interface 51 drives each unit by the power supply of the external device, and charges the battery 6 when the battery 6 can be charged. On the other hand, when the power supply of the external device cannot be used, power is supplied from the battery 6 to drive each unit.

The display unit 52 is mounted on the upper surface of the second circuit board 5, and is visible through the transparent lid plate 23. The display unit 52 is, for example, an organic EL panel or a liquid crystal panel, and displays various types of information. When the display of the various types of information are performed by light emission of the display unit 52, it is possible to allow the user to visually recognize only the information displayed on the display unit 52 excluding an internal structure by adopting the lid plate 23 colored in a color of a predetermined system.

The configuration of the electronic device 1 is described above. Next, a method of using the electronic device 1 will be described. The electronic device 1 includes three types of interfaces that transmit commands to the processing unit 42, that is, the wireless communication interface 43, the wired communication interface 54, and the user interface 53. The electronic device 1 includes a wireless communication mode Ma in which the electronic device 1 is used in a state of being connected to the external device via the wireless communication interface 43, a wired communication mode Mb in which the electronic device 1 is used in a state of being connected to the external device via the wired communication interface 54, and a single mode Mc in which the electronic device 1 is used alone without being connected to the external device. As described above, by including a plurality of operation modes Ma, Mb, and Mc, the user can select an operation mode suitable for a use situation, and the convenience of the electronic device 1 is improved. In the following description, the wireless communication interface 43 and the wired communication interface 54 are collectively referred to as a communication interface 8.

In the single mode Mc, the user may select a desired mode M by operating the mode switching switch 532 and the determination switch 533 while confirming the information displayed on the display unit 52. In the wireless communication mode Ma and the wired communication mode Mb, the user may connect the external device to the electronic device 1 via the communication interface 8, and operate the electronic device 1 using a dedicated application installed in the external device to select the desired mode M.

The method of using the electronic device 1 is described above. Next, a processing method in the processing unit 42 will be described. In general, in the electronic device including the plurality of types of interfaces for transmitting commands to the processing unit, an operation of selecting a type of an interface may be required. Further, in such an electronic device, when commands received via the plurality of interfaces collide with each other, there is a concern that an unintended failure occurs and robustness decreases. In order to avoid collision between commands by organizing the commands, it is necessary to perform complicated internal processing, and there is a concern that the processing load or the manufacturing cost of the electronic device is increased.

Therefore, the processing unit 42 invalidates the commands from the interfaces other than the interface from which the command first received by the processing unit after start-up of the electronic device 1 is transmitted. That is, as shown in FIG. 8, the processing unit 42 is set to the wireless communication mode Ma when a command C43 from the wireless communication interface 43 is first received after the start-up of the electronic device 1, and then invalidates commands C54 and C53 from the other interfaces, that is, the wired communication interface 54 and the user interface 53 until the measurement ends or when there is an instruction from the user.

Similarly, as shown in FIG. 9, the processing unit 42 is set to the wired communication mode Mb when the command C54 from the wired communication interface 54 is first received after the start-up of the electronic device 1, and then invalidates the commands C43 and C53 from the wireless communication interface 43 and the user interface 53. As shown in FIG. 10, the processing unit 42 is set to the single mode Mc when the command C53 from the user interface 53 is first received after the start-up of the electronic device 1, and then invalidates the commands C43 and C54 from the wireless communication interface 43 and the wired communication interface 54.

The processing is shown in a flowchart, as shown in FIG. 11. That is, after the electronic device 1 is started by turning on the power supply, the processing unit 42 starts receiving command inputs via the interfaces 43, 53, and 54 in step S1. Next, in step S2, the processing unit 42 repeats the determination of the presence or absence of the command inputs from the interfaces 43, 53, and 54.

Then, when the command input from the user interface 53 is first received, in step S3, the processing unit 42 determines the interface to be received as the user interface 53 and sets the user interface 53 to the single mode Mc, and thereafter, invalidates the command inputs from the other interfaces 43 and 54. When the command input from the wired communication interface 54 is first received, in step S4, the processing unit 42 determines the interface to be received as the wired communication interface 54 and sets the wired communication interface 54 to the wired communication mode Mb, and thereafter, invalidates the command inputs from the other interfaces 43 and 53. When the command input from the wireless communication interface 43 is first received, in step S5, the processing unit 42 determines the interface to be received as the wireless communication interface 43 and sets the wireless communication interface 43 to the wireless communication mode Ma, and thereafter, invalidates the command inputs from the other interfaces 53 and 54.

According to this method, it is possible to easily avoid collision between the commands received via the plurality of interfaces without complicating the internal processing of the processing unit 42. Therefore, the electronic device 1 can exhibit high robustness while preventing an increase in cost. A method of invalidating the commands is not particularly limited, and may be, for example, processing on software such as discard of the commands, or processing on a circuit that blocks a signal line using a switch element or the like.

The invalidation of the commands is continued until the power supply of the electronic device 1 is turned off. The invalidation of the commands may be reset according to a predetermined operation of the user with respect to the user interface 53.

Further, after determining the interface for receiving a command, the processing unit 42 selects the command. In the following description, for convenience of description, a case where the command C43 from the wireless communication interface 43 is received and the commands C54 and C53 from the wired communication interface 54 and the user interface 53 are invalidated will be described as a representative. As described above, the electronic device 1 includes the plurality of modes M1 to M5. Therefore, the processing unit 42 invalidates commands other than a command that is valid for the selected mode M. In other words, the processing unit 42 invalidates commands not defined in the selected mode M.

That is, when a command CM1 that is valid for the acceleration measurement mode M1, a command CM2 that is valid for the angular velocity measurement mode M2, a command CM3 that is valid for the vibration measurement mode M3, a command CM4 that is valid for the inclination measurement mode M4, and a command CM5 that is valid for the VC measurement mode M5 are defined, as shown in FIG. 12, the processing unit 42 invalidates the commands CM2, CM3, CM4, and CM5 other than the command CM1 in the acceleration measurement mode M1.

Similarly, the processing unit 42 invalidates the commands CM1, CM3, CM4, and CM5 other than the command CM2 in the angular velocity measurement mode M2, invalidates the commands CM1, CM2, CM4, and CM5 other than the command CM3 in the vibration measurement mode M3, invalidates the commands CM1, CM2, CM3, and CM5 other than the command CM4 in the inclination measurement mode M4, and invalidates the commands CM1, CM2, CM3, and CM4 other than the command CM5 in the VC measurement mode M5. Accordingly, it is possible to avoid collision between the valid commands and the invalid commands for the selected mode M. Therefore, the electronic device 1 can exhibit high robustness.

When the electronic device 1 is driven in the wireless communication mode Ma or the wired communication mode Mb, communication between the external device and the electronic device 1 may be temporarily interrupted due to the communication environment. In addition, communication may be interrupted due to an error on the external device side or an error on the electronic device 1 side. Therefore, in the electronic device 1, a state request command as a request signal for requesting state information indicating a state of the electronic device 1 is set as a command that is valid in the wireless communication mode Ma and the wired communication mode Mb, in other words, as a command from the communication interface 8.

When the processing unit 42 receives the state request command via the communication interface 8 in the wireless communication mode Ma or the wired communication mode Mb, the processing unit 42 transmits the state information of the electronic device 1 to the external device in response to a request. Accordingly, the external device can recover an operation state of the electronic device 1 or determine a state of the external device based on the state information. Therefore, the robustness of the external device can be improved. In addition, when there is no response to the state request command, it can be determined that the electronic device 1 is in a state in which the electronic device 1 cannot communicate with the external device or that the electronic device 1 is in a failure state.

The electronic device 1 is described above. The electronic device 1 includes the processing unit 42, and the wireless communication interface 43, the wired communication interface 54, and the user interface 53 as the plurality of interfaces for transmitting commands to the processing unit 42. The processing unit 42 invalidates the commands from the interfaces other than the interface from which the command first received by the processing unit after start-up is transmitted. According to this method, it is possible to easily avoid collision between the commands received via the plurality of interfaces without complicating the internal processing of the processing unit 42. Therefore, the electronic device 1 can exhibit high robustness while preventing an increase in cost.

As described above, the processing unit 42 has a plurality of modes M, and invalidates the commands other than the command that is valid for the selected mode M. Accordingly, it is possible to avoid collision between the valid commands and the invalid commands for the selected mode M. Therefore, the electronic device 1 can exhibit high robustness.

As described above, the plurality of interfaces include the user interface 53 for detecting an operation of the user and the communication interface 8 for communicating with the external device. Accordingly, the convenience of the electronic device 1 is improved.

As described above, the command from the communication interface 8 includes the state request command as the request signal for requesting the state information indicating the state of the electronic device 1. Accordingly, the external device can recover the operation state of the electronic device 1 or determine the state of the external device based on the state information. Therefore, the robustness of the external device can be improved. In addition, when there is no response to the state request command, it can be determined that the electronic device 1 is in a state in which the electronic device 1 cannot communicate with the external device or that the electronic device 1 is in a failure state.

As described above, the communication interface 8 includes the wired communication interface 54 for performing wired communication with the external device, and the wireless communication interface 43 for wirelessly communicating with the external device. Accordingly, the convenience of the electronic device 1 is improved.

As described above, the electronic device 1 includes the physical quantity sensor 30 that outputs a signal corresponding to a physical quantity, and the processing unit 42 measures the physical quantity based on the signal. Accordingly, the electronic device 1 can be used as an inertial measurement unit.

As described above, a method of processing the electronic device 1 is a processing method of the electronic device 1 including the processing unit 42, and the wireless communication interface 43, the wired communication interface 54, and the user interface 53 as the plurality of interfaces for transmitting commands to the processing unit 42. The processing unit 42 invalidates the commands from the interfaces other than the interface from which the command first received by the processing unit after start-up is transmitted. According to this method, it is possible to easily avoid collision between the commands received via the plurality of interfaces without complicating the internal processing of the processing unit 42. Therefore, the electronic device 1 can exhibit high robustness while preventing an increase in cost.

Although the electronic device and the method of processing the electronic device according to the present disclosure are described above based on the embodiment, the present disclosure is not limited thereto. A configuration of each part can be replaced with any configuration having the similar function. In addition, any other constituents may be added to the present disclosure. In the embodiment described above, the electronic device 1 is described as an example of the inertial measurement unit. The electronic device 1 is not particularly limited, and can be applied to any device including a plurality of interfaces.

What is claimed is:

1. An electronic device comprising:
a processing unit; and
a plurality of interfaces configured to transmit commands to the processing unit, wherein
the plurality of interfaces includes a user interface, a wireless communication interface, and a wired communication interface,
the processing unit invalidates the commands from the interfaces other than the interface from which the command first received by the processing unit after start-up is transmitted, and
the processing unit is configured to:
validate only one of the commands, which is received at a first time after the electronic device starts up, from one of the plurality of interfaces; and
invalidates all remaining commands of the commands from the plurality of interfaces except for the one of the commands from the one of the plurality of interfaces.

2. The electronic device according to claim 1, wherein
the processing unit has a plurality of modes, and
the processing unit is configured to invalidate the commands other than the command that is valid for the mode being selected.

3. The electronic device according to claim 1, wherein
the user interface is configured to detect an operation of a user, and
each of the wireless and wired communication interfaces is configured to communicate with an external device.

4. The electronic device according to claim 3, wherein
the command from one of the wireless and wired communication interfaces includes a request signal requesting state information indicating a state of the electronic device.

5. The electronic device according to claim 3, wherein
the wired communication interface is configured to perform wired communication with the external device, and
the wireless communication interface is configured to wirelessly communicate with the external device.

6. The electronic device according to claim 1, further comprising:
a physical quantity sensor configured to output a signal corresponding to a physical quantity, wherein
the processing unit is configured to measure the physical quantity based on the signal.

7. A method of processing an electronic device including a processing unit and a plurality of interfaces that transmit commands to the processing unit, the method comprising:
validating only one of the commands, which is received at a first time after the electronic device starts up, from one of the plurality of interfaces, the plurality of interfaces including a user interface, a wireless communication interface, and a wired communication interface; and invalidating all remaining commands of the commands from the plurality of interfaces except for the one of the commands from the one of the plurality of interfaces.

\* \* \* \* \*